United States Patent
Isogai et al.

(10) Patent No.: US 8,992,728 B2
(45) Date of Patent: Mar. 31, 2015

(54) CELLULOSE NANOFIBER, PRODUCTION METHOD OF SAME AND CELLULOSE NANOFIBER DISPERSION

(75) Inventors: Akira Isogai, Tokyo (JP); Tsuguyuki Saito, Tokyo (JP)

(73) Assignee: The University of Tokyo, Tokyo (JP)

( * ) Notice: Subject to any disclaimer, the term of this patent is extended or adjusted under 35 U.S.C. 154(b) by 515 days.

(21) Appl. No.: 12/734,782

(22) PCT Filed: Nov. 26, 2008

(86) PCT No.: PCT/JP2008/071422
§ 371 (c)(1),
(2), (4) Date: May 24, 2010

(87) PCT Pub. No.: WO2009/069641
PCT Pub. Date: Jun. 4, 2009

(65) Prior Publication Data
US 2010/0233481 A1    Sep. 16, 2010

(30) Foreign Application Priority Data

Nov. 26, 2007    (JP) ................ P2007-304411

(51) Int. Cl.
*B23B 5/00*  (2006.01)
*C12P 19/04*  (2006.01)
*C08B 1/00*  (2006.01)
*D21H 13/02*  (2006.01)
*C08B 15/04*  (2006.01)
(Continued)

(52) U.S. Cl.
CPC . *C08B 15/04* (2013.01); *C08L 1/04* (2013.01); *D21H 11/20* (2013.01); *D21C 9/002* (2013.01); *D21H 15/02* (2013.01); *Y10S 977/706* (2013.01)
USPC ............... 162/9; 162/72; 162/81; 162/157.6; 8/181; 536/56; 977/706

(58) Field of Classification Search
None
See application file for complete search history.

(56) References Cited

U.S. PATENT DOCUMENTS

| 4,374,702 A | 2/1983 | Turbak et al. |
| 5,414,079 A * | 5/1995 | Banker et al. .................. 536/56 |

(Continued)

FOREIGN PATENT DOCUMENTS

| JP | 56-100801 | 8/1981 |
| JP | 2001-509199 | 7/2001 |

(Continued)

OTHER PUBLICATIONS

Saito et al., "Cellulose Nanofibers Prepared by TEMPO-Mediated Oxidation of Native Cellulose", Jul. 13, 2007, Biomacromolecules 2007, pp. 2485-2491.*
European Search Report (in English), EP 08 85 3302.1, dated May 25, 2012.
Notification of Transmittal of the International Search Report and the Written Opinion of the International Searching Authority, or the Declaration (PCT/ISA/220) with the International Search Report (PCT/ISA/210) and Written Opinion of the International Searching Authority (PCT/ISA/237) (in Japanese), dated Mar. 10, 2009, issued in PCT/JP2008/071422.

(Continued)

*Primary Examiner* — Richard Crispino
*Assistant Examiner* — Eric Yaary
(74) *Attorney, Agent, or Firm* — Hamilton, Brook, Smith & Reynolds, P.C.

(57) ABSTRACT

The cellulose nanofiber production method of the present invention comprises an oxidation treatment step for oxidizing native cellulose in a neutral or acidic reaction solution containing an N-oxyl compound and an oxidizing agent that oxidizes aldehyde groups, and a dispersion step for dispersing the native cellulose in a medium following the oxidation treatment step. According to the production method of the present invention, a cellulose nanofiber is provided that has long fibers and demonstrates high strength.

4 Claims, 10 Drawing Sheets

(51) Int. Cl.
  *C08L 1/04*   (2006.01)
  *D21H 11/20*  (2006.01)
  D21C 9/00    (2006.01)
  D21H 15/02   (2006.01)

(56) References Cited

U.S. PATENT DOCUMENTS

| | | | |
|---|---|---|---|
| 6,127,573 A * | 10/2000 | Li et al. | 562/419 |
| 6,379,494 B1 | 4/2002 | Jewell et al. | |
| 6,716,976 B1 | 4/2004 | Jetten et al. | |
| 6,831,173 B1 * | 12/2004 | Jetten et al. | 536/124 |
| 2002/0098317 A1 * | 7/2002 | Jaschinski et al. | 428/72 |
| 2005/0121159 A1 * | 6/2005 | Jetten et al. | 162/81 |

FOREIGN PATENT DOCUMENTS

| | | |
|---|---|---|
| JP | 2001-226893 | 8/2001 |
| JP | 2002-511440 | 4/2002 |
| JP | 2002-194691 | 7/2002 |
| JP | 2003-512540 | 4/2003 |
| JP | 2003-180812 | 7/2003 |
| JP | 2008-001728 | 1/2008 |
| WO | WO 95/21901 | 8/1995 |
| WO | WO 98/33822 | 8/1998 |
| WO | WO 99/23117 | 5/1999 |
| WO | WO 01/29309 | 4/2001 |
| WO | WO 2005/058972 A1 | 6/2005 |

OTHER PUBLICATIONS

International Search Report (in English), PCT/JP2008/071422, mailing date Mar. 10, 2009.
Battista, O.A., "Hydrolysis and Crystallization of Cellulose," *Industrial and Engineering Chemistry*, 42(3): 502-507 (Mar. 1950).
Saito, T., et al., "Homogeneous Suspensions of Individualized Microfibrils from TEMPO-Catalyzed Oxidation of Native Cellulose," *Biomacromolecules*, 7(6): 1687-1691 (Jun. 2006).
Saito, T., et al., "Cellulose Nanofibers Prepared by TEMPO-Mediated Oxidation of Native Cellulose," *Biomacromolecules*, 8(8): 2485-2491 (2007).
Decision of Rejection for Japanese Application No. 2009-543822, entitled: "Cellulose Nanofiber and Process for Production Thereof, and Cellulose Nanofiber Dispersion" dated Jun. 25, 2013.
Cellulose Dictionary, *Asakura Publishing Co., Ltd.*, pp. 155-156 (Nov. 10, 2000).
Decision of Rejection for JP Application No. 2009-543822, "Cellulose Nanofiber, Production Method of Same and Cellulose Nanofiber Dispersion", Date of Mailing: Apr. 22, 2014.
Saito, T., et al., "Introduction of Aldehyde groups on surfaces of native cellulose fibers by TEMPO-mediated oxidation", *Colloids and Surfaces A: Physicochem. Eng. Aspects*, 289: 219-225 (2006).

* cited by examiner

□ pH 3.5
△ pH 4.8
○ pH 6.8
● pH 6.8 without NaClO

Diffraction angle 2θ (degree)

FIG. 7
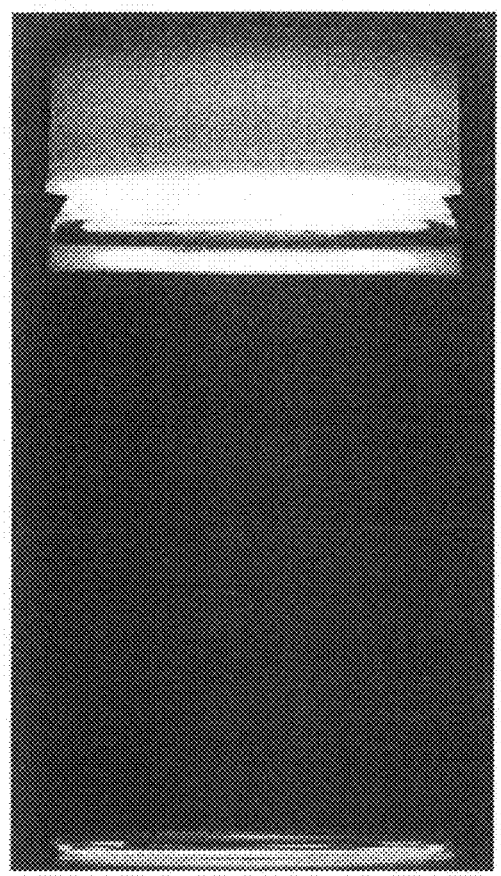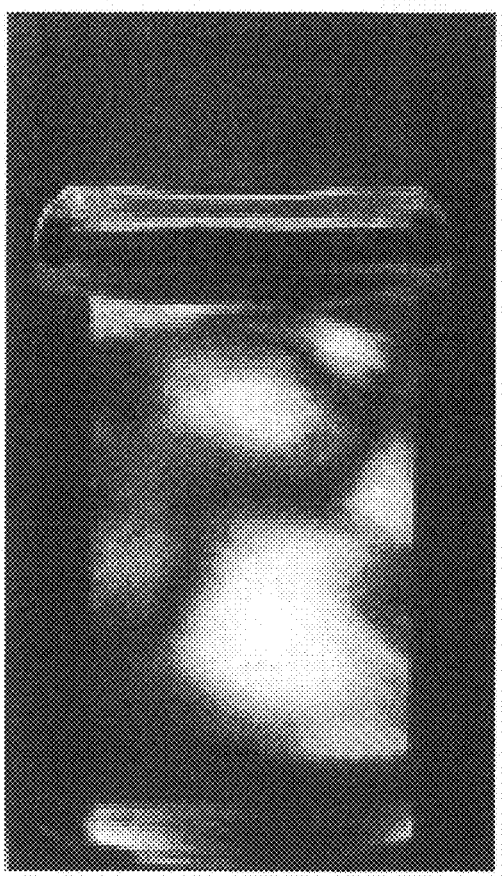

GLUCOSE COMPONENT
IN CELLULOSE

SODIUM GLUCURONATE
COMPONENT HAVING
NEGATIVE CHARGE

IN THE TEMPO-CATALYZED OXIDATION REACTION AT PH 8 TO 11,
THE RELATIONSHIP OF m>n IS ALWAYS VALID, IN OTHER WORDS,
CELLULOSE MOLECULAR WEIGHT DECREASES.

FIG. 10
STRUCTURAL MODEL OF CRYSTALLINE MICROFIBRILS OF WOOD CELLULOSE
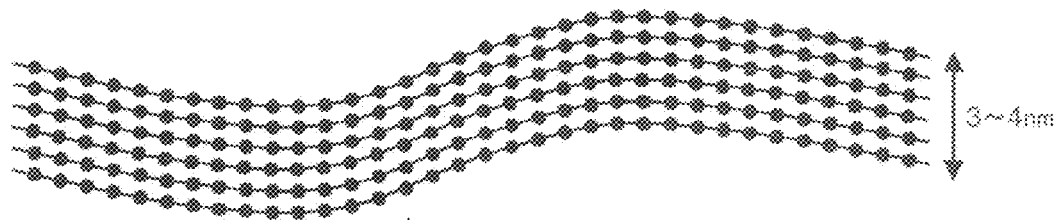
3~4nm
TEMPO-CATALYZED OXIDATION REACTION
STRUCTURAL MODEL OF SINGLE CELLULOSE NANOFIBERS
OBTAINED BY TEMPO-CATALYZED OXIDATION
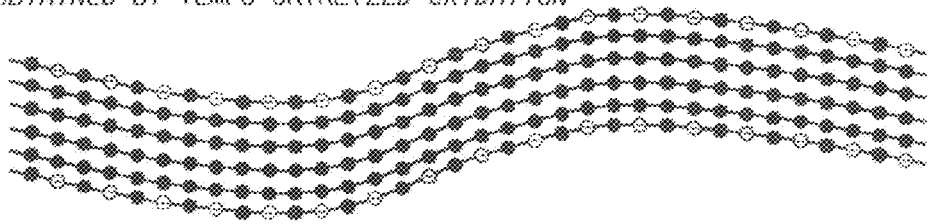
● : GLUCOSE COMPONENT
◎ : NEGATIVELY-CHARGED SODIUM
    GLUCURONATE COMPONENT

CELLULOSE NANOFIBER, PRODUCTION METHOD OF SAME AND CELLULOSE NANOFIBER DISPERSION

RELATED APPLICATIONS

This application is the U.S. National Stage of International Application No. PCT/JP2008/071422, filed Nov. 26, 2008, which designates the United States, published in Japanese, and claims priority under 35 U.S.C. §§119 or 365(c) to Japanese Application No. 2007-304411, filed Nov. 26, 2007. The entire teachings of the above applications are incorporated herein by reference.

TECHNICAL FIELD

The present invention relates to a cellulose nanofiber, a production method of the same, and a cellulose nanofiber dispersion.

BACKGROUND ART

Cellulose, which is a biomass present in large amounts in nature, is without exception in the form of nanofibers referred to as microfibrils at the time fiber is formed by biosynthesis, and these nanofibers are characterized by growing into larger units of fibers by clustering in the direction of the fiber. Bundles of fibers formed in this manner are in a dry state, and primarily function as sturdy structural materials of plants. In these cellulose macro-structural materials, since nanofibers are strongly clustered by bonding forces mainly mediated by hydrogen bonds between the surfaces thereof, they are unable to easily disperse into individual nanofibers.

Patent Document 1 discloses a technology for obtaining nanofibers by treating universally acquirable plant-based purified cellulose (such as wood pulp or linter pulp) with a high-pressure homogenizer. On the other hand, Patent Document 2 and Non-Patent Document 1 disclose a method for pulverizing cellulose using chemical treatment conditions (acid hydrolysis method).

[Patent Document 1] Japanese Unexamined Patent Application, First Publication No. S56-100801
[Patent Document 2] Published Japanese Translation No. H9-508658 of PCT International Publication
[Patent Document 3] Japanese Patent Application No. 2006-169649
[Non-Patent Document 1] O. A. Battista, Ind. Eng. Chem., 42, 502 (1950)
[Non-Patent Document 2] Saito, T., Nishiyama, Y., Putaux, J. L., Vignon, M., Isogai, A.: "Homogeneous Suspensions of Individualized Microfibrils from TEMPO-Catalyzed Oxidation of Native Cellulose", Biomacromolecules, 7(6), 1687-1691 (2006)
[Non-Patent Document 3] Saito, T., Kimura, S., Nishiyama, Y., Isogai, A., "Cellulose Nanofibers Prepared by TEMPO-Mediated Oxidation of Native Cellulose", Biomacromolecules, 8(8), 2485-2491 (2007)

DISCLOSURE OF THE INVENTION

Problems to be Solved by the Invention

However, in the method described in Patent Document 1, a considerable amount of energy is required for treatment with the high-pressure homogenizer, thereby making this disadvantageous in terms of costs. In addition, the fiber diameter of the resulting pulverized fibers is not uniform, and coarse fibers of 1 μm or more end up remaining under typical treatment conditions. On the other hand, in the methods described in Patent Document 2 and Non-Patent Document 1, the cellulose fibers are known to fragment and shorten, thereby making it difficult to pulverize the fibers while maintaining their shape.

With this in mind, the inventors of the present proposed a method for preparing oxides of various types of native cellulose by allowing an oxidizing agent to act on the cellulose in the presence of a TEMPO (2,2,6,6-tetramethylpiperidine-N-oxyl) catalyst (to be referred to as the method of the prior application). According to this method of the prior application, single nanofibers can be produced that have a width of 3 to 20 nm and are completely separated into individual nanofibers. Furthermore, results obtained according to this production method are described in Non-Patent Documents 2 and 3.

In the aforementioned production method of the prior application, an oxidation reaction is allowed to proceed by adding a main oxidizing agent in the form of an aqueous solution of sodium hypochlorite (NaClO) to an aqueous dispersion of native cellulose fibers containing catalytic amounts of NaBr and TEMPO. In this production method, since the pH lowers due to the formation of carboxyl groups during the reaction, the pH is maintained within the range of 8 to 11 by continuously adding dilute aqueous sodium hydroxide solution (normally NaOH at about 0.5 M).

FIGS. 8 and 9 indicate the mechanism by which aldehyde groups of primary hydroxyl groups of cellulose are oxidized to carboxyl groups by using sodium hypochlorite for the main oxidizing agent and adding catalytic amounts of sodium bromide (NaBr) and TEMPO.

Native cellulose is composed of structural units in the form of crystalline microfibrils (degree of crystallization: 65 to 95%, composed of 30 to 100 cellulose molecules). In the aforementioned method, as shown in FIG. 10, only primary hydroxyl groups at position C6 located on the surface of native cellulose microfibrils are selectively oxidized to carboxyl groups or aldehyde groups while maintaining the structure of these highly crystalline cellulose microfibrils. As a result, sodium salts of the carboxyl groups are formed at high density only on the surface of the cellulose microfibrils, thereby allowing the obtaining of cellulose nanofibers in which the individual nanofibers are completely separated by utilizing the charge repulsion between individual microfibrils attributable to the negative charge possessed by the carboxyl groups.

However, as a result of conducting further studies, the inventors of the present invention clearly found that there are problems with the aforementioned production method of the prior application and the resulting cellulose nanofibers. The following provides a detailed explanation of those problems.

(1) First, cellulose nanofibers obtained by the production method of the prior application have an average degree of polymerization of about 200, which is considerably lower than the degree of polymerization of native cellulose (about 1400). This decrease in molecular weight of cellulose causes decreased strength even if the degree of crystallization is high in the case of using the cellulose nanofibers as a material. Although a film that uses cellulose nanofibers produced with the production method of the prior application has high strength and high elastic modulus, if it were possible to inhibit this decrease in molecular weight of the cellulose, it can be expected to realize film having even higher strength and higher elastic modulus.

Therefore, an object of the present invention is to provide a cellulose nanofiber that inhibits decreases in molecular weight of the cellulose, has long fibers and has superior strength, along with a production method thereof.

(2) When a film is produced by heat-drying a dispersion of cellulose nanofibers obtained by the production method of the prior application, the film becomes colored. This coloration can present a problem in terms of quality in applications requiring transparency and whiteness.

Therefore, an object of the present invention is to provide a cellulose nanofiber that does not demonstrate coloration even when subjected to heat treatment, along with a production method thereof.

(3) In the production method of the prior application, the yield of cellulose nanofibers is about 80 to 90%. This is thought to be due to a portion of the cellulose component dissolving in water due to undergoing a decrease in molecular weight caused by side reactions that occur due to the TEMPO-catalyzed oxidation reaction. Consequently, decomposition products end up being contained in the reaction solution and washing solutions, thereby raising waste liquid treatment costs.

Therefore, an object of the present invention is to provide a production method of a cellulose nanofiber that is obtained at high yield without forming unnecessary decomposition products.

(4) Cellulose nanofibers obtained by the production method of the prior application contain carboxyl groups and aldehyde groups. Among these, since aldehyde groups do not have a negative charge, they do not demonstrate action that promotes the formation of nanofibers by defibration treatment. Therefore, if it were possible to oxidize these aldehyde groups to carboxyl groups, the negative charge on the surface of the microfibrils would increase, thereby leading to expectations of improved efficiency of defibration treatment.

Therefore, an object of the present invention is to provide a production method of a cellulose nanofiber capable of improving the efficiency of nanofiber formation.

(5) In the production method of the prior application, since it is necessary to maintain a constant pH of the reaction solution at all times during the TEMPO-catalyzed oxidation reaction, a pH meter must be placed in the reaction solution and a dilute aqueous NaOH solution must be continuously dropped into the reaction solution to maintain the pH. Consequently, the reaction system is an open system that cannot be sealed. In addition, since the reaction vessel cannot be sealed, this method is also disadvantageous in terms of treatment of gases formed by the reaction and reaction efficiency.

Therefore, an object of the present invention is to provide a production method of cellulose nanofiber that facilitates management of pH and enables the reaction vessel to be sealed by making improvements to the reaction system.

Means for Solving the Problems

In order to solve the aforementioned problems, the production method of cellulose nanofiber of the present invention comprises an oxidation treatment step for oxidizing native cellulose in a neutral or acidic reaction solution containing an N-oxyl compound and an oxidizing agent that oxidizes aldehyde groups, and a dispersion step for dispersing the native cellulose in a medium following the oxidation treatment step.

In the production method of the present invention, since oxidation treatment is carried out on native cellulose using an oxidizing agent that oxidizes aldehyde groups in the presence of an N-oxyl compound, hydroxyl groups on the surface of microfibrils of the cellulose can be oxidized to carboxyl groups, thereby making it possible to prevent the formation of an aldehyde group at position C6.

Here, in the production method of the prior application, since TEMPO-catalyzed oxidation is carried out under weakly alkaline conditions at pH of 8 to 11, as indicated in the middle of FIG. 11, an aldehyde group (CHO group) is formed at position C6 as an intermediate. This aldehyde group undergoes a beta-elimination reaction extremely easily under conditions of pH 8 to 11. As a result, as indicated on the right side of FIG. 11, the molecular chain of the cellulose is severed, and this is thought to cause a considerable decrease in the molecular weight of the resulting cellulose nanofibers.

In contrast, in the production method of the present invention, the formation of aldehyde groups can be prevented as previously described, and even if aldehyde groups are present for a short period of time, since the pH of the reaction solution is either neutral or acidic, the beta-elimination reaction that occurs under weakly to strongly alkaline conditions does not occur. Thus, according to the present invention, severing of the cellulose molecular chain by reaction of aldehyde groups can be prevented and the molecular chain remains long, thereby allowing the production of cellulose nanofibers that demonstrate superior strength.

In addition, since aldehyde groups are oxidized rapidly, only carboxyl groups having a negative charge are formed on the surface of microfibrils of the cellulose, thereby enabling charge repulse to act effectively in the dispersion step and allowing the microfibrils to be separated extremely efficiently.

In addition, in the production method of the prior application, although the amount of aldehyde groups formed on the surface of cellulose nanofibers is 0.5 mmol/g or less (and normally 0.3 mmol/g or less), which is small in comparison to the amount of carboxyl groups, these aldehyde groups remain on the surface of the cellulose nanofibers after washing. Consequently, coloration is thought to occur due to similar reactions with caramelization of reduced sugars having aldehyde groups.

In contrast, in the production method of the present invention, since an oxidizing agent that oxidizes aldehyde groups is used for the oxidizing agent, even if aldehyde groups at position C6 remain in the oxidation treatment step, all of these groups are oxidized and converted to carboxyl groups. Thus, cellulose nanofibers obtained by the production method of the present invention do not contain aldehyde groups, and even if they are subjected to heat treatment or heated drying treatment, coloration does not occur. Consequently, according to the present invention, cellulose nanofibers can be produced that are capable of producing films, composite materials and the like that are colorless and have superior transparency.

As has been explained above, according to the present invention, the problems (1) to (4) of the production method of the prior application can be solved.

In addition, in the present invention, a buffer is preferably added to the reaction solution in the oxidation treatment step. As a result of employing such a production method, it is no longer necessary to add acid or base to maintain pH, while also eliminating the need for a pH meter. Thus, in the present production method, the reaction vessel can be sealed, thereby making it possible to solve problem (5).

Sealing of the reaction vessel makes it possible to heat and pressurize the reaction system. In addition, the resulting production method is superior in terms of safety as well since gas generated from the reaction solution is not released outside the system. In addition, since gas formed by decomposition of the oxidizing agent also does not dissipate into the atmosphere, there is the additional advantage of being able to reduce the amount of oxidizing agent used.

A halous acid or salt thereof can be used for the oxidizing agent. In addition, a mixture of hydrogen peroxide and oxidizing enzyme or a peracid can also be used for the oxidizing agent. The use of these oxidizing agents enables primary hydroxyl groups to be oxidized to carboxyl groups, thereby making it possible to effectively prevent formation of aldehyde groups at position C6.

In the oxidation treatment step, the pH of the reaction solution is preferably from 4 to 7. As a result of making the pH to be within this range, the oxidizing agent is able to efficiently act on the native cellulose, thereby enabling cellulose nanofibers to be efficiently produced in a short period of time.

In the oxidation treatment step, a hypohalous acid or salt thereof is preferably added to the reaction solution. As a result of employing such a production method, the reaction rate can be increased considerably, thereby making it possible to greatly improve the production efficiency of cellulose nanofibers.

The N-oxyl compound is preferably 2,2,6,6-tetramethyl-1-piperidine-N-oxyl) (TEMPO). Alternatively, the N-oxyl compound is preferably 4-acetoamide-TEMPO.

The dispersion step preferably comprises mechanical defibration treatment. As a result of employing such a production method, cellulose can be subjected to defibration treatment and converted to nanofibers with high efficiency and at low cost.

Next, the cellulose nanofiber of the present invention has a maximum fiber diameter of 1000 nm or less and a number average fiber diameter of 2 to 150 nm, and at least a portion of hydroxyl groups located on the surface of cellulose microfibrils are only oxidized to carboxyl groups.

In addition, the cellulose nanofiber of the present invention has a maximum fiber diameter of 1000 nm or less and a number average fiber diameter of 2 to 150 nm, and the content of aldehyde groups is less than 0.05 mmol/g.

The content of carboxyl groups is preferably 0.5 mmol/g or more based on the weight of the cellulose.

In addition, the average degree of polymerization is preferably 600 or more and more preferably 900 or more.

Moreover, the maximum fiber diameter is preferably 500 nm or less and the number average fiber diameter is preferably 2 to 100 nm, and the maximum fiber diameter is more preferably 30 nm or less and the number average fiber diameter is more preferably 2 to 10 nm.

Cellulose nanofibers obtained by the production method in the present invention can be specified according to the aforementioned characteristics. All of the cellulose nanofibers are novel cellulose nanofibers with a narrow width, long molecular chain and superior characteristics not found in the prior art.

Next, the cellulose nanofiber dispersion of the present invention is obtained by dispersing the cellulose nanofiber of the present invention in a medium. According to this dispersion, high-strength nanofibril structures can be easily obtained by heat treatment or drying treatment.

Effects of the Invention

According to the cellulose nanofiber production method of the present invention, cellulose nanofibers can be produced which are only oxidized to carboxyl groups and which do not become colored even if heated. In addition, cellulose nanofibers can be produced that have a high degree of polymerization and superior strength.

According to the cellulose nanofiber of the present invention, since it is only oxidized to carboxyl groups, the cellulose nanofiber is not colored even if heated, and structures can be formed that have superior transparency or whiteness. In addition, due to the high degree of polymerization, the nanofiber is able to form structures having superior strength.

In addition, the cellulose nanofiber dispersion of the present invention becomes a highly viscous dispersion at low concentrations as a result of containing long, narrow cellulose nanofibers.

BRIEF DESCRIPTION OF THE DRAWINGS

FIG. 7 depicts observation photographs of a cellulose nanofiber dispersion in water.

FIG. 10 is a drawing showing structural models of cellulose microfibrils.

BRIEF DESCRIPTION OF THE REFERENCE SYMBOLS

Figure 1:
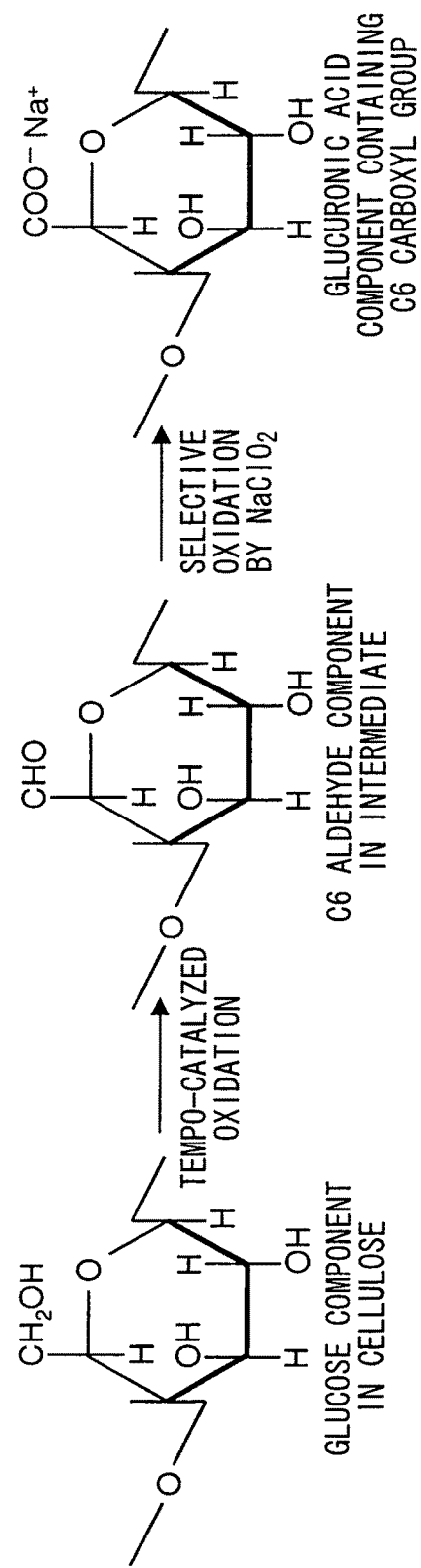
FIG. 1 is a drawing showing a mechanism by which carboxyl groups are formed in the production method in the present invention.

100 Reaction vessel
101 Cap
110 Reaction solution
120 Heating device

BEST MODE FOR CARRYING OUT THE INVENTION

The following provides an explanation of embodiments of the present invention with reference to the drawings.

The cellulose nanofiber production method in the present invention includes an oxidation treatment step for oxidizing a raw material in the form of native cellulose by allowing an oxidizing agent that oxidizes aldehyde groups to act on the native cellulose by using an N-oxyl compound for the oxidation catalyst under conditions in which a reaction solution is neutral or acidic, and a dispersion step for dispersing the native cellulose in a medium following the oxidation treatment step.

In the oxidation treatment step, a dispersion in which native cellulose is dispersed in water is first prepared. The native cellulose is purified cellulose that has been isolated from cellulose biosynthesis system such as a plant, animal, bacteria-producing gel. Specific examples of the purified cellulose include cellulose that has been isolated from coniferous wood pulp, deciduous wood pulp, cotton-based pulp such as cotton linter or cotton lint, non-wood-based pulp such as pulp from barley or bagasse pulp, bacteria cellulose, cellulose isolated from sea squirt and cellulose isolated from sea grass.

In the oxidation treatment step, water is typically used for the dispersion medium of the native cellulose in the reaction solution. There are no particular limitations on the concentration of native cellulose in the reaction solution provided the reagents (oxidizing agent, catalyst and the like) can be adequately dissolved. Normally, the concentration of the native cellulose is preferably about 5% or less based on the weight of the reaction solution.

In addition, treatment for increasing the surface area of beating and the like may be performed on the isolated and purified native cellulose. This makes it possible to enhance reaction efficiency and increase productivity. In addition, native cellulose is preferably used that has been stored in a continuously moist state following isolation and purification. Since storing in a continuously moist state enables bundles of microfibrils to be maintained in a state that allows them to swell easily, this serves to enhance reaction efficiency while also facilitating the obtaining of cellulose nanofibers having a narrow fiber diameter.

An N-oxyl compound is used for the catalyst added to the reaction solution. Examples of N-oxyl compounds that can be used include TEMPO (2,2,6,6-tetramethylpiperidine-N-oxyl) and TEMPO derivatives having various types of functional groups at position C4. TEMPO and 4-acetoamide-TEMPO in particular allow the obtaining of preferably results in terms of the reaction rate.

Although a catalytic amount is adequate for the amount of the N-oxyl compound added, more specifically, the N-oxyl compound is added to the reaction solution within the range of 0.1 to 4 mmol/l. The N-oxyl compound is preferably added within the range of 0.1 to 2 mmol/l.

An oxidizing agent capable of also oxidizing aldehyde groups formed by oxidation of hydroxyl groups is used for the oxidizing agent. Examples of such oxidizing agents include halous acids and salts thereof (such as sodium chlorite), mixtures of hydrogen peroxide and oxidizing enzymes (laccase), and peracids. Furthermore, various types of peracids can be used, such as persulfuric acid (such as potassium hydrogen persulfate), peracetic acid or perbenzoic acid. The content of the oxidizing agent is preferably within the range of 1 to 10 mmol/l.

The use of an oxidizing agent capable of oxidizing aldehyde groups to carboxyl groups in this manner makes it possible to prevent the formation of an aldehyde group at position C6. FIG. 1 is a drawing showing the mechanism by which carboxyl groups are formed in the present invention. As shown in FIG. 1, in an oxidation reaction in which the N-oxyl compound is used for the catalyst, a primary hydroxyl group of a glucose component can be selectively oxidized to form an intermediate containing an aldehyde group. In the present invention, however, since an oxidizing agent is contained that oxidizes aldehyde groups, the aldehyde group of this intermediate is rapidly oxidized and converted to a carboxyl group.

As a result, cellulose nanofibers can be obtained that are free of aldehyde groups.

In addition, a hypohalous acid or salt thereof is preferably added on the premise of using the aforementioned oxidizing agent as a main oxidizing agent. For example, the reaction rate can be improved considerably by adding a small amount of sodium hypochlorite. If an excessive amount of a salt of a hypohalous acid and the like is added, there is the risk of being unable to obtain the desired cellulose nanofibers since this also ends up functioning as a main oxidizing agent. Therefore, the amount of salt of a hypohalous acid and the like added is preferably about 1 mmol/l or less.

The pH of the reaction solution is preferably maintained within the range of a neutral to acidic pH. More specifically, the pH of the reaction solution is preferably within a pH range of 4 to 7.

Moreover, a buffer is preferably added to the reaction solution. Various buffers can be used, examples of which include phosphate buffer, acetate buffer, citrate buffer, borate buffer, tartrate buffer and Tris buffer.

The use of a buffer to inhibit pH changes in the reaction solution eliminates the need for continuous addition of acid or base to maintain the pH while also eliminating the need for installing a pH meter. Elimination of the need for addition of acid or base makes it possible to seal the reaction vessel.

Figure 2:
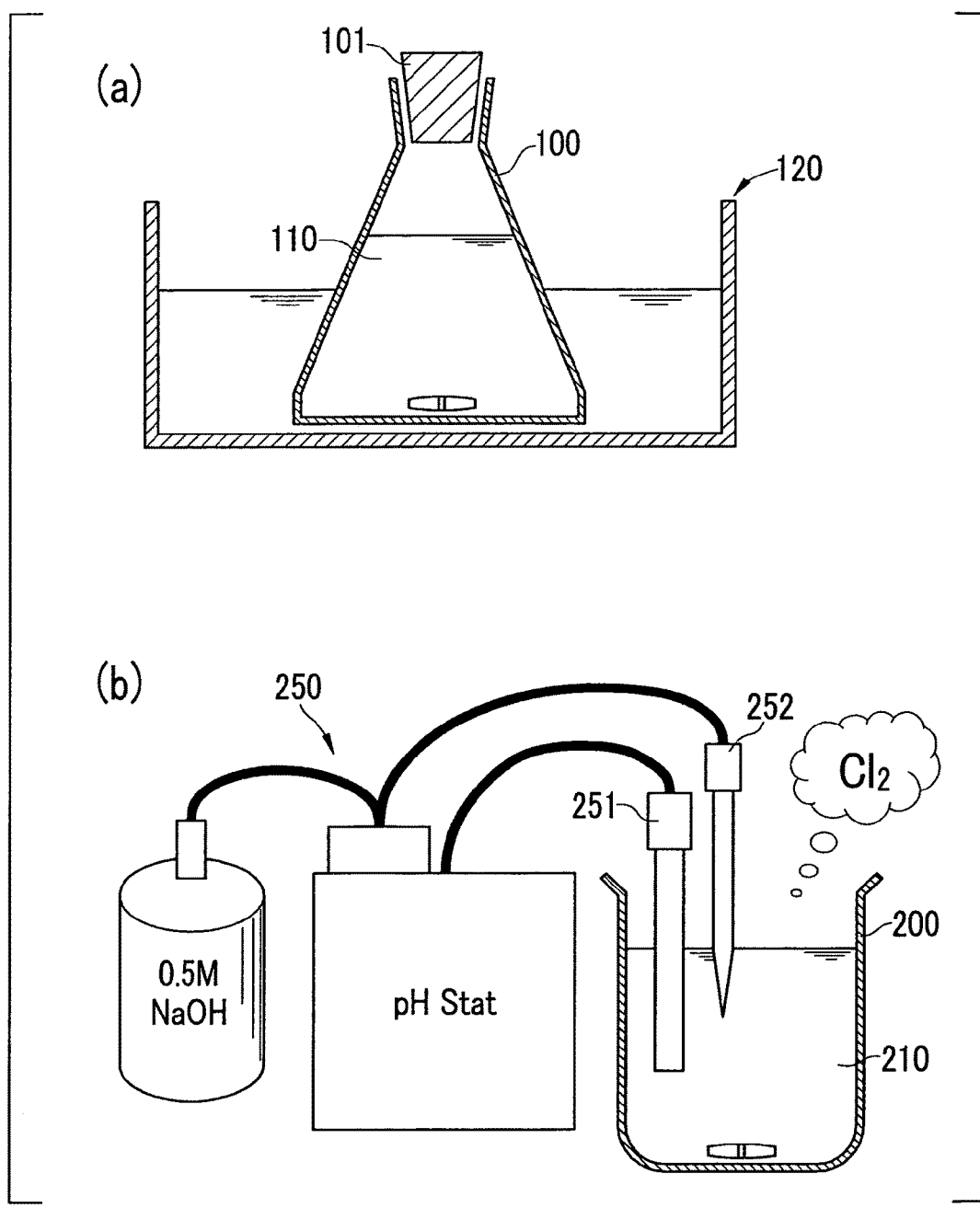
FIG. 2 is a drawing showing an apparatus used in the production method in the present invention and an apparatus used in the production method of the prior application.

Here, FIG. 2(a) shows an example of an apparatus for carrying out the production method of the present invention, while FIG. 2(b) shows an apparatus for carrying out the production method of the prior application.

As shown in FIG. 2(a), in the production method of the present invention, a reaction solution 110, containing a raw material, catalyst, oxidizing agent, buffer and the like, is contained in a reaction vessel 100, and the reaction vessel 100 is sealed by a cap 101. In addition, the reaction vessel 100 can be heated using a heating device such as a temperature bath 120 to raise the reaction temperature. In addition, a pressure device may also be installed to pressurize the inside of the reaction vessel 100.

On the other hand, in the production method of the prior application shown in FIG. 2(b), the upper portion of a reaction vessel 200 that contains a reaction solution 210 is open, and a pH electrode 251 of an additionally installed pH adjustment device 250, along with a nozzle 252 for supplying a diluted NaOH solution for adjusting pH, are installed in the reaction solution 210 through the opening section. In this production method of the prior application, since the reaction vessel 210 is forced to be of the open type, a portion of chlorine gas formed by decomposition of a co-oxidizing agent in the form of sodium hypochlorite end up being released into the atmosphere. Consequently, an apparatus is required for treating the released chlorine gas, and an amount of sodium hypochlorite must be added beyond that which is necessary due to loss of oxidizing agent.

In the production method in the present invention in this manner, as a result of being able to seal the reaction vessel 100, reaction efficiency can be enhanced by raising the temperature of the reaction solution 110. Thus, according to the present invention, cellulose nanofibers can be efficiently produced in a short period of time. On the other hand, although the temperature of the reaction solution 210 can also be raised in the production method of the prior application as well, since the amount of chlorine gas released increases, this method is disadvantageous in terms of treating the exhaust gas and the amount of oxidizing agent used.

In the production method of the present invention, a purification step for removing unreacted oxidizing agent and raw material which did not react in the oxidation treatment step may be provided between the oxidation treatment step and the dispersion step. Namely, a step may be provided for removing substances other than cellulose that has undergone oxidation treatment (oxidized cellulose) and water outside the system.

However, the oxidized cellulose is still not separated into nanofiber units at this stage, and retains the fibrous state of the raw material in the form of native cellulose. Thus, the oxidized cellulose can be recovered at a yield of nearly 100% using an ordinary purification method consisting of repeated rinsing and filtering. In addition, since the oxidized cellulose retains its original fibrous state, there are no difficulties in filtration or handling caused by prominent swelling or gelling due to nanofiber formation in the purification stage. In this manner, the production method in the present invention is advantageous in terms of ease of the purification step and handling.

Furthermore, any arbitrary apparatus can be used for the purification method of the aforementioned purification step provided it enables the object of the purification step to be achieved, an example of which is an apparatus that utilizes centrifugal dehydration (such as a continuous decanter).

Next, in the dispersion step, the oxidized cellulose obtained in the oxidation treatment step or oxidized cellulose that has gone through the purification step is dispersed in a medium. As a result, a cellulose nanofiber dispersion is obtained in which cellulose nanofibers are dispersed in the medium.

Although water is normally preferable for the medium used for dispersion (dispersion medium), a hydrophilic organic solvent other than water can also be used according to the purpose. Examples of such hydrophilic organic solvents include alcohols that are soluble in water (such as methanol, ethanol, isopropanol, isobutanol, sec-butanol, tert-butanol, methyl cellosolve, ethyl cellosolve, ethylene glycol or glycerin), ethers (such as ethylene glycol dimethyl ether, 1,4-dioxane or tetrahydrofuran), ketones (such as acetone or methyl ethyl ketone), N,N-dimethylformamide, N,N-dimethylacetoamide and dimethylsulfoxide. Moreover, a plurality of hydrophilic organic solvents may also be used as a mixture.

Various apparatuses can be used for the dispersion apparatus (defibration apparatus) used in the dispersion step. For example, a home blender, ultrasonic homogenizer, high-pressure homogenizer, biaxial kneading apparatus or stone mill or other defibration apparatus can be used. In addition to these examples, defibration apparatuses typically used for home use or industrial use allow a dispersion of cellulose nanofibers to be easily obtained. In addition, the use of a powerful defibration apparatus having a considerable beating capacity in the manner of various types of homogenizers or various types of refiners allows cellulose nanofibers having a narrow fiber diameter to be obtained more efficiently.

The cellulose nanofiber in the present invention is then obtained by removing the dispersion medium from the cellulose nanofiber dispersion obtained from the aforementioned steps. A commonly known drying treatment can be used to remove the dispersion medium. Namely, the dispersion medium can be easily removed by drying treatment using, for example, a freeze-drying apparatus, drum dryer or spray dryer.

In addition, a compound having a high boiling point and affinity for cellulose in the manner of water-soluble polymers and sugars can be mixed into the cellulose nanofiber dispersion in the form of a binder followed by subjecting the resulting mixture to drying treatment. Since cellulose nanofibers obtained in this manner are able to be re-dispersed in the dispersion medium, handling becomes easier than circulating as a dispersion.

Furthermore, the amount of binder added to the dispersion medium is preferably within the range of 10 to 80% by weight based on the amount of cellulose.

In addition, examples of water-soluble polymers include polyethylene oxide, polyvinyl alcohol, polyacrylamide, carboxymethyl cellulose, hydroxyethyl cellulose, hydroxypropyl cellulose, methyl cellulose, starch and natural gum. Examples of sugars include glucose, fructose, mannose, galactose and trehalose.

Next, the cellulose nanofiber obtained by the production method of the present invention as explained above can be specified as a cellulose nanofiber that has a maximum fiber diameter of 1000 nm or less, has a number average fiber diameter of 2 to 150 nm, and in which at least a portion of hydroxyl groups located on the surfaces of cellulose microfibrils are only oxidized to carboxyl groups.

Alternatively, the cellulose nanofiber obtained by the production method of the present invention can be specified as a cellulose nanofiber that has a maximum fiber diameter of 1000 nm or less, has a number average fiber diameter of 2 to 150 nm, and in which the aldehyde group content thereof is less than 0.05 mmol/g.

Namely, aldehyde groups at position C6 on the surface of cellulose microfibrils are completely absent or can be considered to be completely absent. Furthermore, the case of being able to consider aldehyde groups as being completely absent is equivalent to the aldehyde group content being less than 0.05 mmol/g. As a result of making the aldehyde group content to be within this range, effects can be obtained that inhibit decreases in degree of polymerization and coloring during heating caused by aldehyde groups. The amount of aldehyde groups is more preferably 0.01 mmol/g or less, and even more preferably 0.001 mmol/g or less.

Furthermore, since the detection limit for aldehyde groups using currently known measurement methods is about 0.001 mmol/g, a preferred embodiment of the present invention is cellulose nanofiber in which aldehyde groups are not detected even if measured.

In addition, in the production method of the prior application, both carboxyl groups and aldehyde groups are always formed in TEMPO-catalyzed oxidation. Thus, the cellulose nanofiber of the present invention can also be specified as clearly differing from cellulose nanofiber obtained in the production method of the prior application by above characteristics.

In addition, the maximum fiber diameter and number average fiber diameter of cellulose nanofibers can be analyzed according to the following methods.

First, a cellulose nanofiber dispersion is prepared having a solid content of 0.05 to 0.1% by weight. This dispersion is then cast in a carbon film-coated grid that has been subjected to lyophilic treatment to obtain a sample for TEM observation. Subsequently, the sample is observed with an electron microscope at a magnification of 5000×, 10000× or 50000×. At that time, when assuming an arbitrary vertical or horizontal axis within the resulting images for the width of the images, sample (density, etc.) and observation (magnification, etc.) conditions are set such that 20 or more fibers cross this axis.

Two random axes each are then drawn in the vertical and horizontal directions for each observation image that satisfies the above conditions, and the fiber diameter of fibers that intersected with the axes is read visually. Values of fiber diameter are read for at least three non-overlapping regions of images in this manner. As a result, information is obtained for a minimum of 20 fibers×2 (axes)×3 (regions)=120 fibers.

Maximum fiber diameter (maximum value) and number average fiber diameter can then be calculated from the resulting fiber diameter data.

Furthermore, although the above analysis was carried out using TEM observation, this may also be carried out by SEM observation in the case the sample contains fibers having a large fiber diameter.

In the present invention, the desired properties of cellulose nanofibers become difficult to obtain in the case the maximum fiber diameter exceeds 1000 nm or the number average fiber diameter exceeds 150 nm. In order to satisfactorily demonstrate properties of cellulose nanofibers, preferably the maximum fiber diameter is 500 nm or less and the number average fiber diameter is 2 to 100 nm, and even more preferably, the maximum fiber diameter is 30 nm or less and the number average fiber diameter is 2 to 10 nm.

Cellulose nanofibers having a maximum fiber diameter of 30 nm or less and a number average fiber diameter of 2 to 10 nm in particular result in a transparent dispersion, and structures such as films obtained by drying this dispersion have superior transparency.

More specifically, the cellulose nanofiber obtained by the production method of the present invention is extremely narrow, having a width of 3 to 10 nm (3 to 4 nm in the case of using wood cellulose or about 10 nm in the case of using cotton cellulose), and the length is 500 nm or more (and normally 1 μm or more), making it longer than "cellulose nanowhiskers (length: 500 nm or less)" obtained by conventional acid hydrolysis and enabling it to demonstrate high strength.

In addition, since the cellulose nanofiber of the present invention does not contain an aldehyde group at position C6, even if the cellulose nanofiber dispersion is heated and dried, colored components derived from the aldehyde group are not formed. Thus, according to the cellulose nanofiber of the present invention, a film or composite material that is colorless and has high transparency can be prepared.

In this manner, the cellulose nanofiber of the present invention is preferable for applications such as highly functional gas-impenetrable packaging materials (films, composite materials), substrates of display devices and substrate materials for electronic devices, due to its excellent strength and transparency.

In addition, the cellulose nanofiber of the present invention also has latent abilities enabling it to be applied to applications such as highly functional water and air filters, supports of powders having catalytic functions, nanofibers for regenerative medicine, health care products and health foods.

In addition, since the cellulose nanofiber of the present invention is derived from biomass and biodegradable, the cellulose nanofiber is carbon-neutral and does not cause increases in carbon dioxide when incinerated (since the plant material was originally formed from carbon dioxide), and is biodegradable when buried in soil, it offers the advantage of not placing a burden on the environment in comparison with petroleum-based materials during the cycle of raw material, production, use and disposal.

In addition, the cellulose nanofiber in the present invention has superior compatibility with other materials and demonstrates extremely high dispersion stabilization effects in a dispersion medium such as water or hydrophilic organic solvent. In addition, since it demonstrates a high level of thixotropy when in the form of a dispersion and gels depending on the conditions, it is also effective as a gelling agent.

Moreover, in the case of compounding the cellulose nanofiber of the present invention with other materials such as resin materials, it is able to demonstrate superior dispersibility in the other materials, thereby facilitating the obtaining of transparent complexes. In addition, the cellulose nanofibers also function as reinforcing fillers in these complexes. Moreover, in the case the cellulose nanofibers form a highly structured network within a complex, remarkably higher strength is obtained as compared with resin materials alone, while also being able to induce remarkable decreases in the coefficient of thermal expansion.

In addition, since the cellulose nanofiber of the present invention also retains the amphiphilic properties of cellulose, it can also be used as an emulsifier or dispersion stabilizer. In particular, since the absolute value of surface charge increases as a result of having carboxyl groups in the fibers thereof, the isoelectric point (concentration at which aggregation begins to occur when ion concentration increases) is expected to shift to a lower pH, and dispersion stabilizing effects can be expected over a broader range of ion concentration conditions. In addition, since the carboxyl groups form counterions with metal ions, these cellulose nanofibers are also effective as metal ion adsorbents.

The following provides a more detailed explanation of the present invention through examples thereof. However, the present invention is not limited by these examples.

Example 1

In this example, an explanation is provided of the results of examining reaction pH, reaction time and reaction temperature.

Wood cellulose (1 g) was respectively dispersed in 0.1 M aqueous acetic acid adjusted to pH 3.5, 0.1 M acetate buffer adjusted to pH 4.8, and 0.1 M phosphate buffer adjusted to pH 6.8, followed by the addition of 0.1 mmol (0.0156 g) of TEMPO and 10 mmol of sodium chlorite (1.13 g of commercially available 80% sodium chlorite) to each solution in an Erlenmeyer flask, sealing the flask and stirring with a magnetic stirrer until the native cellulose was adequately dispersed.

Subsequently, 2.5 mL of an aqueous sodium hypochlorite solution having a concentration of 0.2 M were added to the reaction solution followed immediately by resealing the flask. The amount of sodium hypochlorite added at this time was 0.5 mmol based on 1 g of native cellulose.

Subsequently, the sealed reaction vessel was stirred for a prescribed amount of time (2 to 72 hours) in a water bath at 25° C., 40° C. or 60° C., followed by repeatedly vacuum filtering and rinsing using a glass filter having a maximum pore diameter of 40 microns to obtain purified fibrous TEMPO-oxidized cellulose.

Furthermore, the oxidized cellulose purified by filtration and rinsing was able to be recovered at a yield of nearly 100% in the case of calculating the theoretical value in consideration of changes in the chemical structure caused by oxidation. This indicates that hardly any cellulose decomposition products attributable to side reactions were present in the waste liquid component, and since not only oxidized cellulose was able to be obtained at high yield, but since this also leads to a reduction in the burden on wastewater treatment, the production method can be said to be more easily adaptable to industrialization.

The resulting oxidized cellulose was then dispersed in water and subjected to defibration treatment with a home blender. In addition, the amount of carboxyl groups of the resulting oxidized cellulose was measured. The results of defibration treatment and carboxyl group measurement are shown in Table 1.

The amount of carboxyl groups can be measured according to the method described below.

First, 60 ml of a 0.5 to 1% by weight slurry is prepared from an oxidized cellulose sample accurately measured for dry weight, and after adjusting the pH to about 2.5 with 0.1 M aqueous hydrochloric acid solution, 0.05 M aqueous sodium hydroxide solution is dropped in to measure electrical conductivity. Electrical conductivity is continued to be measured until the pH reaches 11. The amount of functional groups is determined using the following equation from the amount of sodium hydroxide (V) consumed at a weakly acidic neutralizing stage during which changes in electrical conductivity became gradual. This amount of functional groups is the amount of carboxyl groups.

Amount of functional groups(mmol/g)=V(ml)×0.05/ weight of cellulose(g)

Furthermore, the amount of aldehyde groups can also be determined from a similar formula. The oxidized cellulose sample used to measure the amount of carboxyl groups as described above is oxidized at room temperature for another 48 hours in a 2% aqueous sodium chlorite solution adjusted to pH 4 to 5 with acetic acid followed by again measuring the amount of functional groups according to the procedure described above. The amount obtained by subtracting the aforementioned amount of carboxyl groups from the measured amount of functional groups is the amount of aldehyde groups.

TABLE 1

| pH | Reaction time (hr) | Temperature (° C.) | Amt. of carboxyl groups in oxidized cellulose (mmol/g) |
|---|---|---|---|
| 3.5 | 6 | 40 | 0.12 |
| 3.5 | 22 | 40 | 0.10 |
| 3.5 | 44 | 40 | 0.13 |
| 4.8 | 6 | 40 | 0.23 |
| 4.8 | 22 | 40 | 0.30 |
| 4.8 | 44 | 40 | 0.41 |
| 4.8 | 72 | 40 | 0.55 (nanofiber formation possible) |
| 6.8 | 2 | 40 | 0.41 |
| 6.8 | 6 | 40 | 0.58 (nanofiber formation possible) |
| 6.8 | 22 | 40 | 0.64 (nanofiber formation possible) |
| 6.8 | 44 | 40 | 0.68 (nanofiber formation possible) |
| 6.8 | 2 | 60 | 0.48 (nanofiber formation possible) |
| 6.8 | 6 | 60 | 0.61 (nanofiber formation possible) |
| 6.8 | 18 | 60 | 0.71 (nanofiber formation possible) |
| 6.8 | 54 | 60 | 0.78 (nanofiber formation possible) |
| 6.8 | 2 | 25 | 0.23 |
| 6.8 | 6 | 25 | 0.34 |
| 6.8 | 18 | 25 | 0.49 (nanofiber formation possible) |
| 6.8 | 24 | 25 | 0.56 (nanofiber formation possible) |
| Raw material native cellulose | | | 0.10 |

In Table 1, under the conditions indicated with "nanofiber formation possible", nearly the entire was converted to a transparent dispersion by defibration treatment with a blender, and nanofibers were confirmed to be able to be formed in which the oxidized cellulose fibers were separated into individual fibers.

Based on these results, in the case the amount of reagent added is constant, oxidized cellulose enabling the formation of nanofibers by defibration treatment was indicated to be obtained by reacting for 2 to 6 hours at 60° C. in a buffered solution at pH 6.8.

In addition, in the case of oxidizing with TEMPO in a buffered solution at pH 6.8 while using sodium chlorite for the main oxidizing agent, nanofibers were determined to be able to be formed when the introduced amount of carboxyl groups is about 0.5 mmol/g. In contrast, in the case of TEMPO oxidation at pH 8 to 11 using sodium hypochlorite for the main oxidizing agent in the production method of the prior application, the amount of carboxyl groups required to form nanofibers by defibration treatment is 1.0 mmol/g or more, and optimally about 1.5 mmol/g. Thus, the production method of the present invention enables the amount of reagent added to be reduced to about one-third that of the production method of the prior application.

Possible reasons for this include greater ease of defibration due to absence of residual aldehyde groups able to form crosslinked structures between the nanofibers, and efficient and uniform introduction of carboxyl groups onto the surface of cellulose microfibrils required for defibration treatment.

Figure 3:
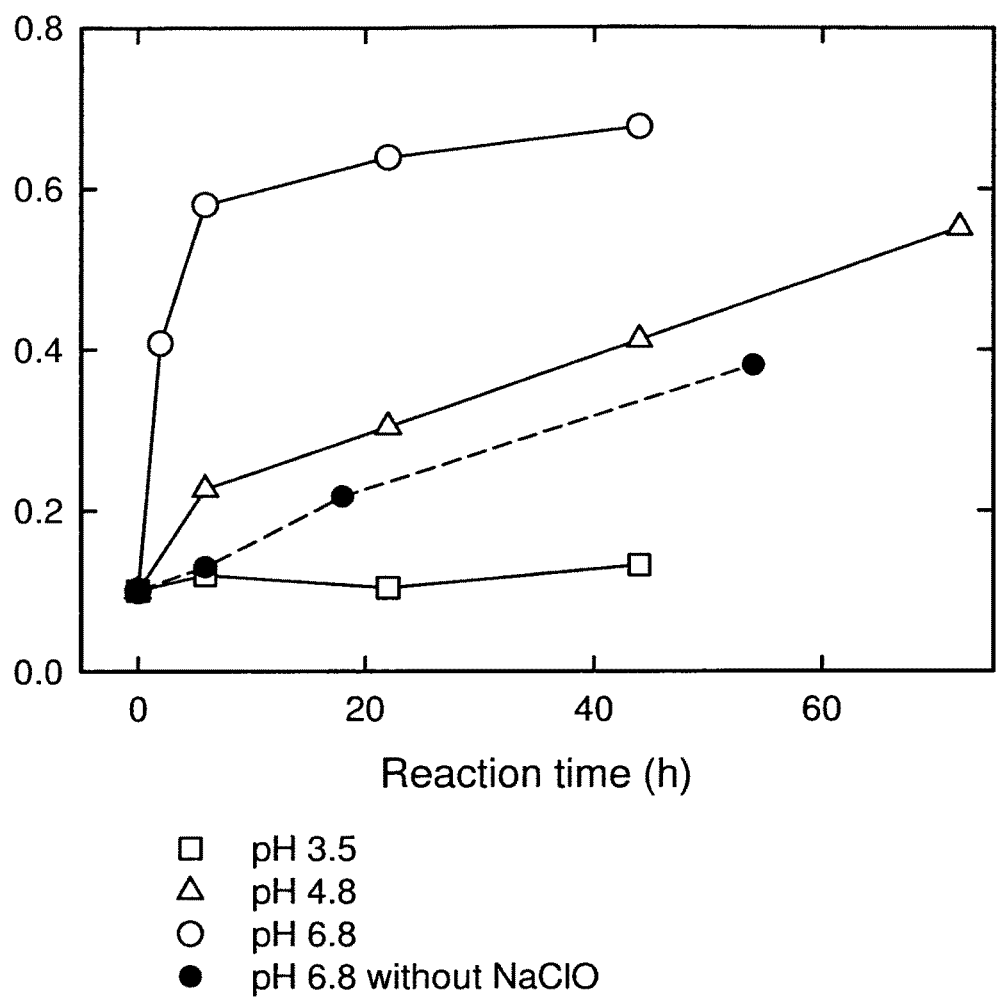
FIG. 3 is a graph showing measurement results of Example 1.

FIG. 3 is graph showing the relationship between reaction time and the amount of carboxyl groups introduced based on the results of Table 1 above. Furthermore, FIG. 3 also shows the results for a sample in which sodium hypochlorite was not added.

As shown in FIG. 3, by controlling the pH of the reaction to 6.8, optimum conditions are obtained that enable the cellulose to be oxidized efficiently and carboxyl groups to be introduced. In addition, nanofibers can also be formed by prolonging the reaction time under conditions of pH 4.8. However, under conditions of pH 3.5, introduction of carboxyl groups no longer progresses and cellulose can no longer be oxidized. On the other hand, sodium chloride has been confirmed to oxidize aldehyde groups to carboxyl groups under conditions of pH 4, and on the basis thereof along with aforementioned results, the preferable pH range of the reaction in the present invention is 4 to 7.

Example 2

In this example, an explanation is provided of the results of examining the amount of sodium hypochlorite added to the reaction solution.

In this example, oxidized cellulose was prepared while varying the amount of sodium hypochlorite added to the reaction solution within the range of 0 to 1.0 mmol/g. Other conditions of the reaction solution were the same as in Example 1.

The results of defibration treatment and carboxyl group measurement in the resulting oxidized cellulose carried out in the same manner as Example 1 are shown in Table 2.

TABLE 2

| Amt. of sodium hypochlorite added (mmol/g) | pH | Reaction time (hr) | Temp. (° C.) | Amt. of carboxyl groups in oxidized cellulose (mmol/g) |
|---|---|---|---|---|
| 0 | 6.8 | 2 | 60 | 0.12 |
| 0.3 | 6.8 | 2 | 60 | 0.41 |
| 0.5 | 6.8 | 2 | 60 | 0.48 |
| 1.0 | 6.8 | 2 | 60 | 0.57 |
| 0.3 | 6.8 | 2 | 40 | 0.36 |
| 0.3 | 6.8 | 6 | 40 | 0.43 |
| 0.3 | 6.8 | 18 | 40 | 0.50 |
| 0.5 | 6.8 | 2 | 40 | 0.41 |
| 0.5 | 6.8 | 6 | 40 | 0.58 |
| 0.5 | 6.8 | 22 | 40 | 0.64 |
| 1.0 | 6.6 | 24 | 60 | 0.67 |

Based on the results of Table 2, the amount of carboxyl groups in the oxidized cellulose increases with increase in the amount of sodium hypochlorite added. In comparison with not adding sodium hypochlorite, remarkable effects are obtained even if added in small amounts, and addition of sodium hypochlorite is effective for improving nanofiber formation efficiency and shortening reaction time. Furthermore, since sodium chlorite no longer acts as the main oxidizing agent if sodium hypochlorite is added in excess, the amount of sodium hypochlorite added is judged to be a maximum of about 1 mmol per 1 gram of cellulose.

Example 3

In this example, an explanation is provided of the results of examining the type of catalyst added to the reaction solution.

Figure 4:
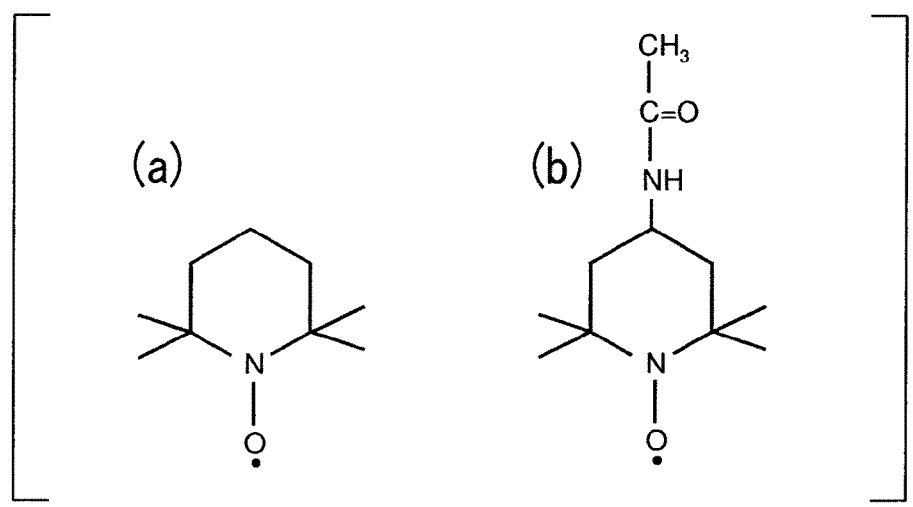
FIG. 4 is a drawing showing the chemical structure of an oxidation catalyst.

In this example, oxidized cellulose was prepared respectively using TEMPO and 4-acetoamide-TEMPO for the oxidation catalyst added to the reaction solution. FIG. 4 shows the chemical structures of these oxidation catalysts. Other conditions of the reaction solution were the same as in Example 1.

The results of carboxyl group measurement in the resulting oxidized cellulose carried out in the same manner as Example 1 are shown in Table 3.

TABLE 3

| Catalyst | pH | Reaction time (hr) | Temp. (° C.) | Amt. of carboxyl groups in oxidized cellulose (mmol/g) |
|---|---|---|---|---|
| 4-acetoamide-TEMPO | 5.0 | 22 | 40 | 0.38 |
| TEMPO | 5.0 | 22 | 40 | 0.30 |
| 4-acetoamide-TEMPO | 6.8 | 22 | 40 | 0.68 |
| TEMPO | 6.8 | 22 | 40 | 0.64 |

Based on the results of Table 3, improvement of efficiency of the oxidation reaction was observed as a result of using 4-acetoamide-TEMPO. However, the effect of pH on the reaction system was considerably greater. Thus, controlling the pH of the oxidation reaction to 6.8 was reconfirmed to be important.

Example 4

In this example, an explanation is provided of the results of verifying the molecular weights of the cellulose nanofibers respectively obtained in the production method of the present invention and the production method of the prior application.

An object of the present invention is to inhibit decreases in molecular weight of oxidized cellulose. As was explained in the previous example, the optimum pH of the reaction solution is 6.8, and since it is difficult for a beta-elimination reaction to occur at this pH, even if aldehyde groups are formed as intermediates, reductions in molecular weight caused by the beta-elimination reaction are considered to not occur. On the contrary, since hydroxyl groups are selectively and rapidly oxidized to carboxyl groups by sodium chlorite, oxidized cellulose is expected to be obtained that demonstrates little decrease in molecular weight and is free of aldehyde groups.

Therefore, in this example, degree of polymerization was measured for oxidized cellulose obtained by the production method of the prior application (oxidized cellulose obtained by reacting at pH 10 using sodium hypochlorite for the main oxidizing agent) and oxidized cellulose of the present invention obtained at pH 6.8 using sodium chlorite for the main oxidizing agent. The results for measuring degree of polymerization are shown in Table 4.

Furthermore, degree of polymerization refers to the "average number of glucose components contained in a single cellulose molecule", and molecular weight is determined by multiplying 162 by the degree of polymerization. In this example, each oxidized cellulose sample was dissolved in a 0.5 M copper-ethylenediamine solution after having preliminarily reduced residual aldehyde groups to alcohol by reducing with sodium borohydride, after which degree of polymerization was determined using the viscosity method. Since the copper-ethylenediamine solution is alkaline, in the case aldehyde groups remain in the oxidized cellulose, a beta-elimination reaction occurs during the dissolution process resulting in the potential for a decrease in molecular weight. Consequently, aldehyde groups were converted to alcoholic hydroxyl groups by preliminary reduction treatment. The following reference may be referred to regarding the formula used to determine the degree of polymerization of cellulose from the viscosity of cellulose dissolved in an 0.5 M copper-ethylenediamine solution.

Reference: Isogai, A., Mutoh, N., Onabe, F., Usuda, M., "Viscosity measurements of cellulose/SO$_2$-amine-dimethylsulfoxide solution", Sen'i Gakkaishi, 45, 299-306 (1989)

TABLE 4

| | pH | Amt. of carboxyl groups (mmol/g) | Degree of polymerization |
|---|---|---|---|
| Original wood cellulose (deciduous bleached kraft pulp) | | 0.10 | 1460 |
| A: NaClO$_2$—NaClO-TEMPO oxidation system | 6.8 | 0.61 | 980 |
| B: NaClO$_2$—NaClO-TEMPO oxidation system | 6.8 | 0.71 | 1050 |
| C: NaClO$_2$—NaClO-TEMPO oxidation system | 6.8 | 0.78 | 900 |
| D: NaClO—NaBr-TEMPO oxidation system | 10.0 | 0.44 | 220 |
| E: NaClO—NaBr-TEMPO oxidation system | 10.0 | 0.93 | 200 |

In Table 4, samples A to C are oxidized cellulose prepared according to the production method of the present invention, while samples D and E are oxidized cellulose prepared according to the production method of the prior application.

Based on the results of Table 4, although the oxidized cellulose obtained with the production method in the present invention (sodium hypochlorite-TEMPO oxidation system using sodium chlorite for the main oxidizing agent) demonstrated a lower molecular weight than the original cellulose, the degree of polymerization was maintained at 60% or more that of the original cellulose. Although a degree of polymerization of 600 or more is typically considered to be necessary for cellulose materials to exhibit strength, the oxidized cellulose according to the present invention far exceeds this degree of polymerization.

On the other hand, the degree of polymerization of the oxidized cellulose obtained with the production method of the prior application (TEMPO-catalyzed oxidation system at pH 10 using sodium hypochlorite for the main oxidizing agent) was about 200, thus demonstrating a considerable decrease in molecular weight and only 14% of the original degree of polymerization. A decrease in molecular weight to this extent is considered to cause a considerable decrease in strength of cellulose materials.

On the basis of these findings, according to the production method in the present invention, oxidized cellulose can be obtained that has a considerably larger degree of polymerization than that of the production method of the prior application, and cellulose nanofibers can be produced that demonstrate the inherent strength of cellulose materials.

Example 5

In this example, an explanation is provided of the results of verifying films respectively produced using cellulose nanofibers obtained with the production method of the present invention and the production method of the prior application.

An object of the present invention is to inhibit coloration when a dispersion of oxidized cellulose is heated. Namely, one of the problems associated with TEMPO-oxidized cellulose obtained with the production method of the prior application was the occurrence of yellowing in the heating and drying process due to the presence of residual aldehyde groups. Therefore, samples C and D shown in Table 4 were dried for 3 hours in an oven at 105° C. followed by measurement of whiteness based on the ISO standard method. The results are shown in Table 5.

TABLE 5

| Sample | Reaction pH | Amt. of aldehyde groups (mmol/g) | Relative whiteness |
| --- | --- | --- | --- |
| Raw material wood cellulose | — | 0.006 | 100 |
| C: Sodium chlorite-based TEMPO-oxidized cellulose | 6.8 | Below detection limit (0.001) | 97 |
| D: Sodium hypochlorite-based TEMPO-oxidized cellulose | 10.0 | 0.31 | 86 |

Based on the results of Table 5, there was hardly any decrease in whiteness relative to the raw material wood cellulose in the case of the oxidized cellulose of sample C obtained with the production method of the present invention. In contrast, a definite decrease in whiteness was observed in the case of the oxidized cellulose of sample D obtained with the production method of the prior application.

Example 6

In this example, an explanation is provided of the results of verifying the crystal structure and degree of crystallization of oxidized cellulose obtained by the production method of the present invention as well as the physical properties of cellulose nanofibers obtained by the production method of the present invention.

Figure 5:
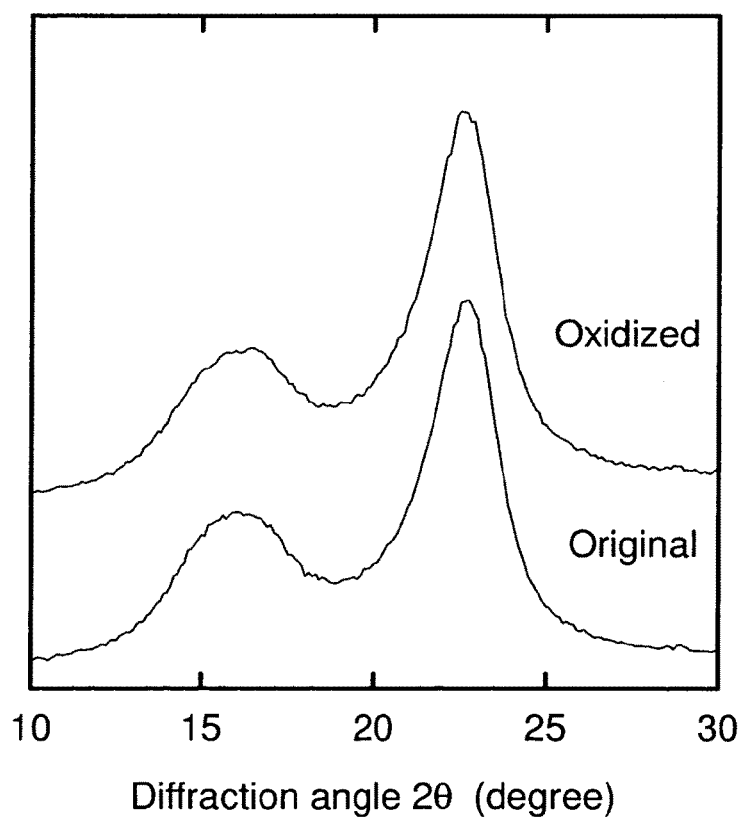
FIG. 5 is a drawing showing measurement results of X-ray diffraction patterns of Example 6.

FIG. 5 is a drawing showing the results of measuring the X-ray diffraction pattern of oxidized cellulose obtained by the production method of the present invention together with the X-ray diffraction pattern of the raw material wood cellulose.

As is clear from FIG. 5, the oxidized cellulose obtained by the production method of the present invention has a crystal structure similar to that of the raw material wood cellulose, and there were no changes in the degree of crystallization or crystal size of the cellulose as calculated from the X-ray diffraction pattern.

Namely, in the production method of the present invention, introduced carboxyl groups were indicated to be present only on the surface of cellulose microfibrils and not formed within cellulose crystals, thereby indicating location-selective oxidation on the surface of crystalline cellulose microfibrils.

Furthermore, if oxidation extending to inside the cellulose crystals had occurred, the degree of crystallization ought to have decreased and crystal size ought to have become smaller.

Next, cellulose nanofibers produced in Example 1 were observed with a transmission electron microscope. The sample used for observation was obtained by dispersing oxidized cellulose, which was produced under conditions of pH 6.8 using sodium chlorite for the main oxidizing agent, in water and subjecting to defibration treatment with a home blender to obtain an optically transparent aqueous dispersion. As was previously indicated, an optically transparent aqueous dispersion is obtained by defibration treatment provided the amount of introduced carboxyl groups is 0.5 mmol/g or more.

Figure 6:
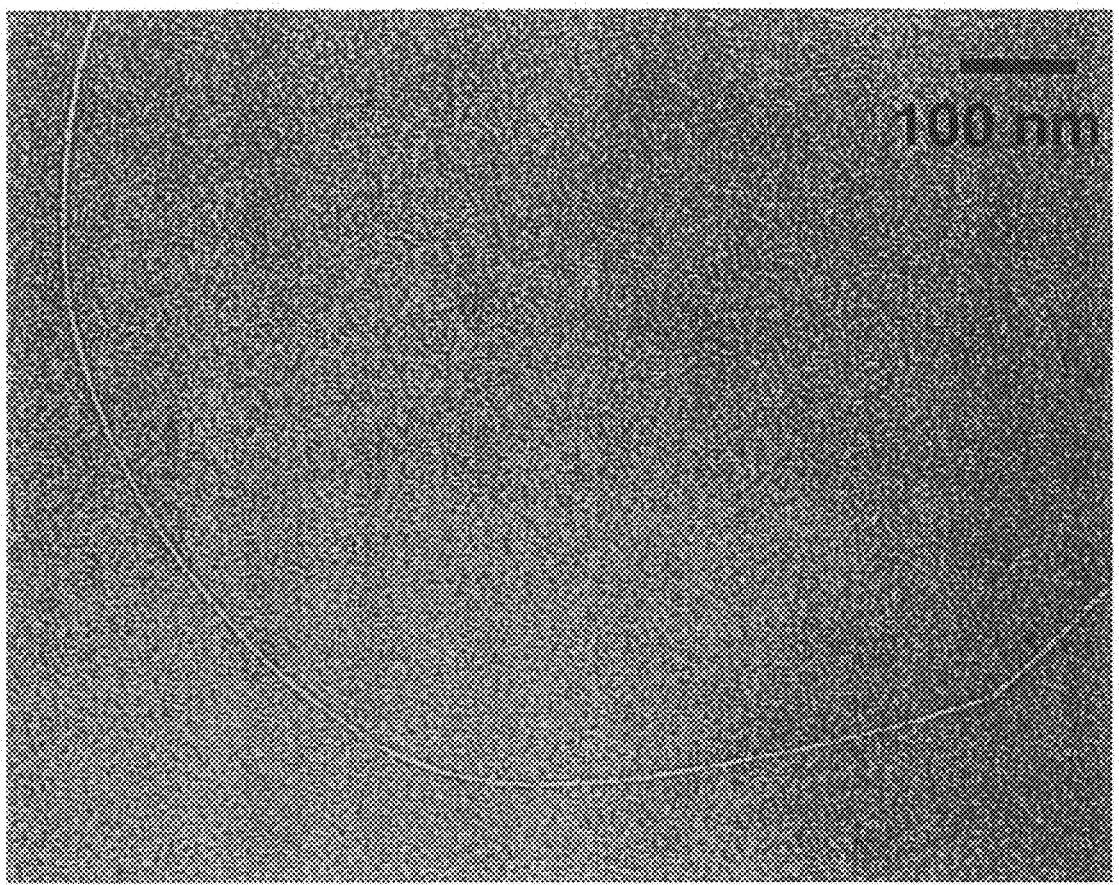
FIG. 6 is an electron micrograph of a cellulose nanofiber.
Figure 8:
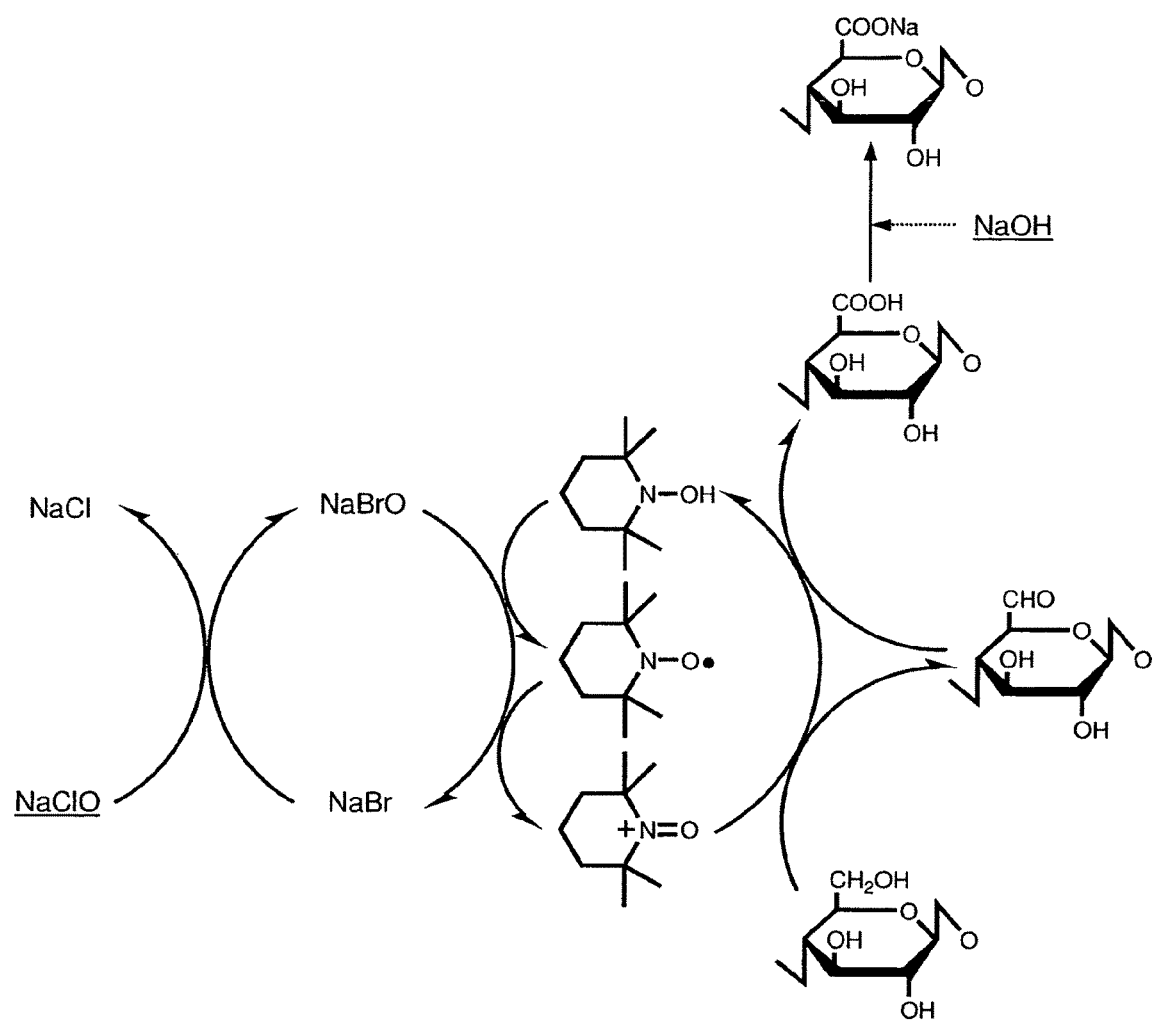
FIG. 8 is a drawing showing a mechanism by which cellulose is oxidized in the production method of the prior application.
Figure 9:
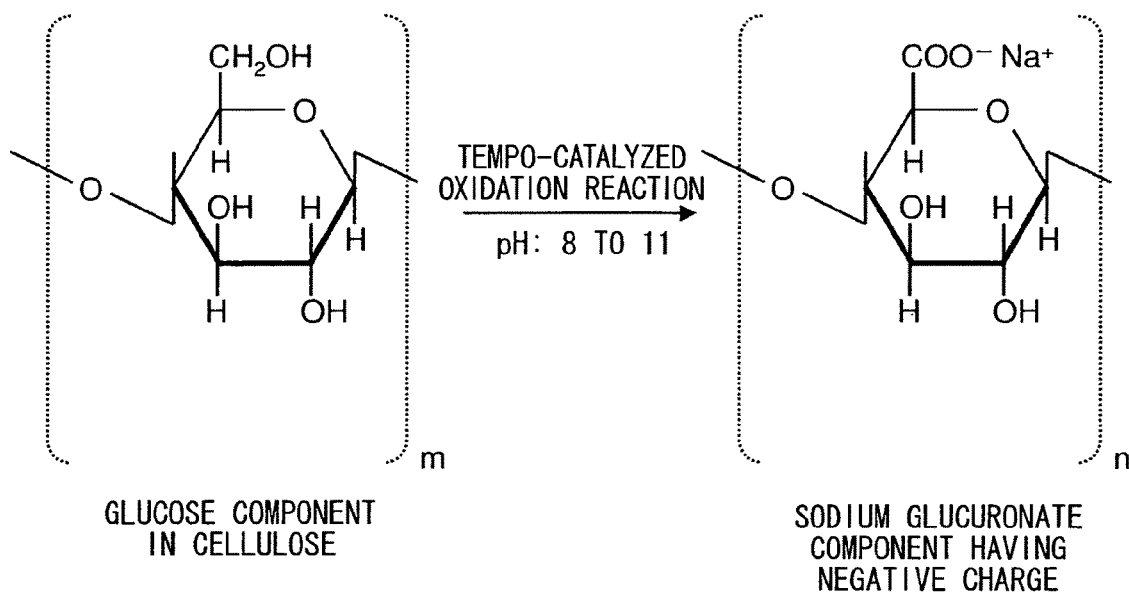
FIG. 9 is a drawing showing a mechanism by which cellulose is oxidized in the production method of the prior application.
Figure 11:
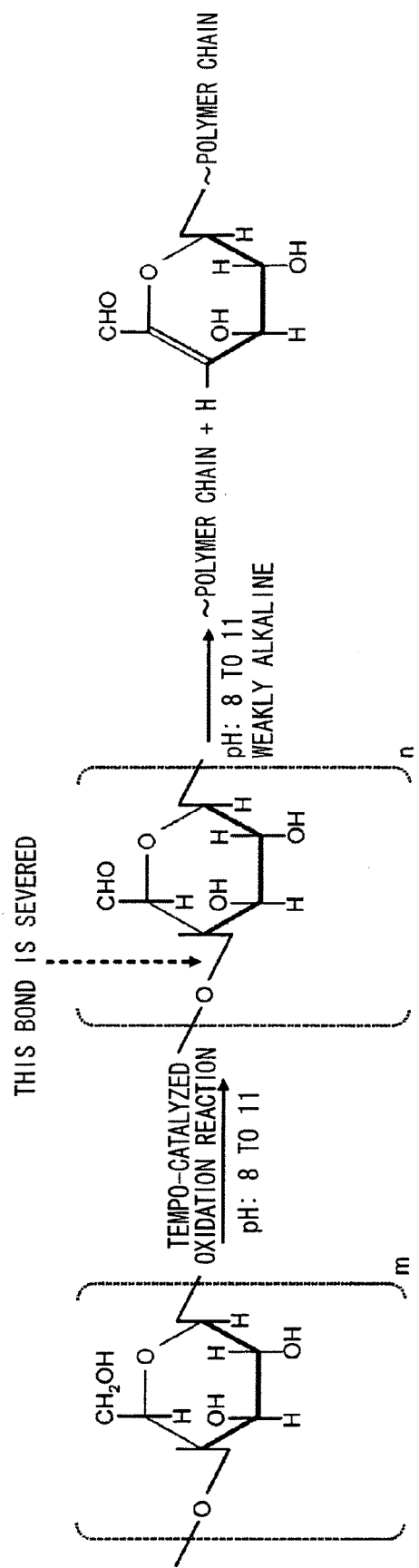
FIG. 11 is a drawing for explaining severing of a molecular chain by a beta-elimination reaction.

FIG. 6 is an image obtained with a electron microscope observation. As shown in FIG. 6, the cellulose nanofibers obtained by the production method of the present invention had a width of 3 to 4 nm and a length of several microns or more, and were completely separated into individual fibers.

As has been described above, a transparent aqueous dispersion of cellulose nanofibers, namely cellulose nanofibers that are completely separated into individual fibers, was able to be prepared by defibration treatment provided the amount of introduced carboxyl groups is 0.5 mmol/g or more. FIG. 7 shows a photograph of the dispersion and a photograph of the dispersion through a polarizing plate.

As is clear from a comparison of the photographs of FIG. 7, the dispersion that appears transparent in the photograph on the left clearly exhibits birefringence in the photograph on the right observed through a polarizing plate. This indicates that the oxidized cellulose is definitely dispersed in the form of nanofibers and that a portion in which they are regularly arranged to a certain extent is present in the aqueous dispersion. In addition, this also suggests the potential for application to optical functional devices such as phase difference plates or optical compensation plates based on this birefringence and orientation.

INDUSTRIAL APPLICABILITY

According to the cellulose nanofiber production method of the present invention, cellulose nanofibers can be produced which are only oxidized to carboxyl groups and which do not exhibit coloration even if heated. In addition, since cellulose nanofibers can be produced that have a high degree of polymerization and superior strength, the production method of the present invention is extremely useful industrially.

The invention claimed is:
1. A cellulose nanofiber production method, comprising:
 (1) dispersing native cellulose in a neutral reaction solution comprising 0.1 to 4 mmol/l of 2,2,6,6-tetramethyl-1-piperidine-N-oxyl and 1 to 10 mmol/l of sodium chlorite,
 (2) adding 1 mmol/l or less of sodium hypochlorite to the neutral reaction solution directly after step (1),
 (3) oxidizing the native cellulose in the neutral reaction solution to obtain an oxidized cellulose after step (2),
 (4) recovering the oxidized cellulose from the neutral reaction solution by purifying the oxidized cellulose by rinsing and filtration after step (3), and
 (5) dispersing the oxidized cellulose in a medium to obtain a cellulose nanofiber dispersion after step (4),
 wherein the amount of the native cellulose in the neutral reaction solution is 5% or less based on the weight of the neutral reaction solution,
 the cellulose nanofiber obtained by step (5) has a maximum fiber diameter of 1000 nm or less, a number average fiber diameter of 2 to 150 nm and an average degree of polymerization of 600 or more,
 the neutral reaction solution comprises at least one buffer selected from the group consisting of phosphate buffer, an acetate buffer, a citrate buffer, a borate buffer, a tartrate buffer and a tris buffer, and
 step (5) comprises a mechanical defibration treatment.
2. The cellulose nanofiber production method according to claim 1, wherein step (3) is carried out by controlling the pH of the reaction to 6.8.
3. The cellulose nanofiber production method according to claim 1, wherein the medium is at least one solvent selected from the group consisting of water and a hydrophilic organic solvent.
4. The cellulose nanofiber production method according to claim 1, wherein the native cellulose is a purified cellulose isolated from at least one cellulose selected from the group consisting of coniferous wood pulp, deciduous wood pulp, cotton based pulp, non-wood based pulp, bacteria cellulose, cellulose isolated from sea squirt, and cellulose isolated from sea grass.

\* \* \* \* \*